United States Patent [19]

Franklin, Jr.

[11] 3,969,446
[45] July 13, 1976

[54] APPARATUS AND METHOD FOR AERATING LIQUIDS

[76] Inventor: Grover C. Franklin, Jr., 2250 Warmouth St., San Pedro, Calif. 90732

[22] Filed: June 3, 1974

[21] Appl. No.: 475,829

[52] U.S. Cl. .................................. 261/87; 261/93
[51] Int. Cl.² ................... C02C 1/10; C02C 1/12; C02C 1/26; C02C 5/04
[58] Field of Search ............... 261/93, DIG. 15, 124, 261/87; 239/214.13

[56] References Cited
UNITED STATES PATENTS

| | | | |
|---|---|---|---|
| 1,148,508 | 8/1915 | Gagnon | 261/93 |
| 2,244,902 | 6/1941 | Stich | 261/93 |
| 2,324,018 | 7/1943 | Petersen | 261/93 |
| 2,639,129 | 5/1953 | De Rosset | 261/93 |
| 3,092,678 | 6/1963 | Braun | 261/87 |
| 3,210,053 | 10/1965 | Boester | 261/93 |
| 3,421,745 | 1/1969 | Prupis | 261/DIG. 15 |
| 3,452,966 | 7/1969 | Smolski | 261/77 |
| 3,482,520 | 12/1969 | Larsen | 261/87 |
| 3,630,498 | 12/1971 | Bielinski | 261/87 |
| 3,852,384 | 12/1974 | Bearden | 261/124 |

*Primary Examiner*—Tim R. Miles
*Assistant Examiner*—Gregory N. Clements
*Attorney, Agent, or Firm*—Gausewitz, Carr & Rothenberg

[57] ABSTRACT

An aerator for dispersing a gas in a liquid comprises an elongate tube having openings at both ends and having mounted therein one or more turbines which are free to rotate about the longitudinal axis thereof. The tube is vertically submerged in a liquid, for example in a lake or pond of water. Air or another gas is supplied to the lower end of the tube. Gas bubbles rising through the tube cause an upward flow of liquid therethrough. The turbines are rotated solely by this upward flow of gas and liquid. The turbine rotation causes the gas bubbles to be broken up into a vast number of very much smaller gas bubbles which are dispersed throughout the liquid, so that optimum gas absorption may occur. The turbines are preferably so constructed that adjacent turbines (if more than one turbine is used) rotate either at different speeds or in counter directions to thus optimize the breaking up of the gas bubbles. A method for aerating a liquid is thereby provided.

12 Claims, 4 Drawing Figures

APPARATUS AND METHOD FOR AERATING LIQUIDS

BACKGROUND OF THE INVENTION

1. Field of the Invention

The field of the invention relates generally to the aeration of liquids. More particularly, it relates to the aeration of liquids by passage of gas bubbles through a tube which is vertically submerged in the liquid and within which tube the rising gas bubbles are broken up by mechanical action into very much smaller gas bubbles which are dispersed within the liquid.

2. Description of the Prior Art

Aeration of liquids is commonly performed, for example, to accelerate bacteriological decomposition of liquid wastes, to prevent algae formation on the surfaces of stagnant pools or ponds, etc. The term "aeration" as employed herein is to be understood as denoting the introduction of any type of gas into any type of liquid.

The simplest method of aeration comprises introducing a gas into a liquid through holes in an appropriate supply line. Some of this gas is absorbed as the gas bubbles rise through the liquid. Unabsorbed gas escapes from the surface of the liquid, and may or may not be captured for recirculation.

This method, though simple, is very inefficient. The gas bubbles, even if small when introduced into the liquid, tend, as they rise, to aggregate into large bubbles or slugs of gas. These gas slugs have comparatively small surface area to volume ratios. That is, there is relatively little gas-to-liquid contact, considering the volumes of the gas bubbles. This results in relatively low rates of gas absorption by the liquid at the liquid-gas interfaces. If the openings at the gas outlet are made very small to introduce small gas bubbles, fouling of the openings often occurs. Also, the transit time of the gas through the liquid may be quite short if the liquid container, for example a pond or holding tank, is shallow. This short gas-to-liquid contact time further results in an inefficient rate of gas absorption by the liquid. In addition, minimal turbulence is created for disrupting the liquid-gas interfaces, disruption and renewal of the interfaces being essential for high rates of gas absorption.

Some slight improvement in absorption efficiency is obtained by use, at the gas injection openings, of nozzles which introduce the gas into the liquid in a swirling manner so as to create some degree of turbulence. This also tends somewhat to delay formation of large gas slugs and somewhat to disperse the gas bubbles through a larger volume of liquid (for example, U.S. Pat. No. 3,276,698). High absorption efficiencies are still not obtained, however.

More commonly used processes employ the pneumatic (or air) lift pump principle. When a gas is bubbled up through an elongate tube which is vertically submerged in a liquid, the rising gas bubbles cause an upward lifting or flow of liquid through the tube. This upward flow of liquid causes a circulation within the entire body of liquid, liquid being continually drawn into the bottom of the tube and being discharged from the top thereof. Turbulence in the liquid above the top of the tube (which is normally submerged well below the surface of the liquid) tends to improve the absorption rate of the gas by breaking up, to some extent, large gas slugs (for example, U.S. Pat. No. 3,032,496) and by disrupting and renewing the liquid-gas interfaces. The liquid circulation and turbulence caused by such pneumatic lifts may also be used to prevent formation of ice on the surface of a liquid, or to reduce the magnitude of surface waves, for example in a harbor area. The absorption efficiency obtained is still much less than desired, however, because large gas slugs still tend to form and remain unbroken, and because the gas-liquid contact time is not appreciably increased. Therefore, a considerable amount of gas must be pumped through such pneumatic lift tubes in order that a small amount may be absorbed by the liquid. Because of the inefficient absorption process, much of the energy used to pump the gas is wasted.

Helical tube dividers installed in some pneumatic lift tubes (for example, U.S. Pat. Nos. 1,144,342 and 3,452,966) increase the gas-liquid contact time by providing increased path lengths for the gas bubbles to travel as they spiral up through the tubes. In addition, the gas and liquid exits from the tops of the tubes with a rotational motion, thereby somewhat increasing the turbulence thereabove. However, large slugs of gas still tend to form within the tubes, with consequent still relatively poor absorption efficiency. Some helical tube dividers (for example, U.S. Pat. No. 1,144,342 are provided with holes interconnecting the adjacent chambers to help prevent formation of large gas slugs. There is little tendency to produce small gas bubbles and the gas absorption efficiency is still much less than desired. Gas which is not absorbed in the bubble transit through the liquid is either lost or must be repumped through the liquid. This requires additional gas pumping capacity and horsepower.

Because of inefficiencies of present pneumatic lift tube aerators, it has been necessary to pump relatively large amounts of gas through the liquid — only a relatively small portion actually being absorbed by the liquid — and to employ a relatively large number of pneumatic lift tubes, particularly when the liquid is contained in shallow tanks or ponds and short tubes must be used. Thus, there has been considerable wastage of gas pumping power with resulting high costs involved in such complex aerator systems.

Some aerators include a motor-driven, horizontally rotating submerged turbine. The non-enclosed turbine is generally positioned above a source of gas bubbles and is used to break up and disperse the released gas bubbles and to create turbulence in the liquid. Other aerators employ motor driven, vertically rotating, non enclosed turbines or paddles at, or just below, the surface of a liquid. Such aerators usually rely upon the air above the surface of the liquid, some of which becomes entrapped in the churning liquid, for aeration. However, motor-driven aeration systems are expensive to produce, to operate and to maintain. A source of power for the motor must also be available.

There have heretofore, to the applicant's knowledge, been no simple, economical, reliable means to achieve efficient aeration with a minimum expenditure of gas pumping horsepower and without the need for auxilliary driving sources for mechanical rotor elements.

SUMMARY OF THE INVENTION

In carrying out principles of the present invention according to a preferred embodiment, an aerator for dispersing gas into a liquid comprises a chamber defining means having upper and lower openings therein adapted for flow of gas and liquid therethrough, the chamber defining means being supported in a liquid in such a manner that at least its lower opening is below the surface of the liquid. Means are provided for supplying gas to the lower opening so that it may bubble up through the chamber defining means and out the upper opening thereof, in the process causing an upward flow of liquid therethrough. A rotatable mixer means is disposed in the chamber defining means between the gas inlet and the surface of the liquid, the mixer means being caused to rotate in response to only the aforementioned upward flow of gas and water. The gas bubbles are thus caused to be broken up into a vast number of very much smaller bubbles. Furthermore, the liquid-gas interfaces are disrupted and reformed, and the very small bubbles are dispersed throughout the liquid. A method for aerating a liquid is thereby provided.

More specifically, an elongate tube having upper and lower openings and having mounted therein one or more turbines or mixers is submerged in a liquid, with the longitudinal axis of the tube substantially vertical. Gas from a suitable source is introduced into the lower end of the tube, and therefore bubbles up and escapes from the upper end, in the process causing an upward flow of liquid through the tube. The turbines, having axes of rotation substantially coincident with the longitudinal axis of the tube and having diameters somewhat less than the inner diameter of the tube, are caused to rotate only by the upward flow of gas and liquid. The rotating turbines cause the rising gas bubbles to be broken up into a vast number of very much smaller bubbles which are dispersed throughout the liquid.

In the preferred embodiment three turbines are employed, adjacent turbines being constructed with different numbers of blades, or blade angles, so that the speeds of rotation of adjacent turbines are different. The turbulence thereby created enhances the breaking up of the rising gas bubbles, the destruction and reformation of liquid-gas interfaces and the dispersion of the gas in the liquid for optimum gas absorption.

In a variation of the preferred embodiment, adjacent turbines, having turbine blades set at opposite angles, are caused to contrarotate.

Annular rings are mounted below and adjacent to the upper and lower turbines to increase the flow velocity of gas bubbles and liquid to these turbines to render the apparatus and method more efficient, and to mount the turbine shaft.

By these means, efficient gas absorption by the liquid is obtained in a tube having a length of preferably only about four tube diameters and without the need for an external turbine driving source. These short tubes are particularly adaptable for efficient aeration of liquids in very shallow ponds or tanks. They are, however, equally useful for any depth of liquid, the efficiency obtained minimizing both the number of tubes required and the quantity of gas which must be pumped through each tube. Important material and energy savings are thereby achieved.

DESCRIPTION OF THE PREFERRED EMBODIMENT

Figure 1:
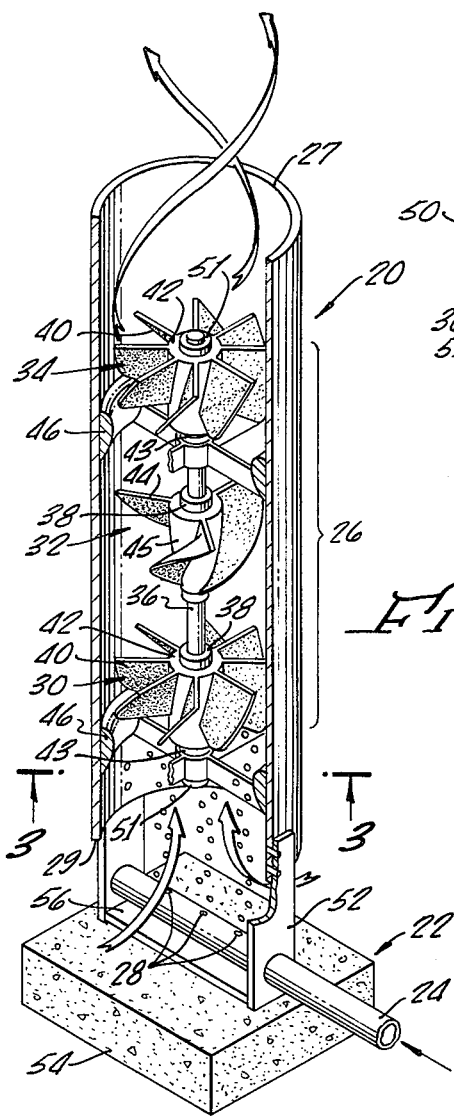
FIG. 1 is a vertical sectional view of the pneumatic lift showing the turbines and the gas supply line.

The aerator, as best seen in FIG. 1, generally comprises an elongate tube, or chamber defining structure 20, a support 22 which is adapted for supporting or anchoring the tube 20 in, for example, a tank or pond of liquid, an air or gas supply line 24 and a turbine mixer assembly 26.

Figure 2:
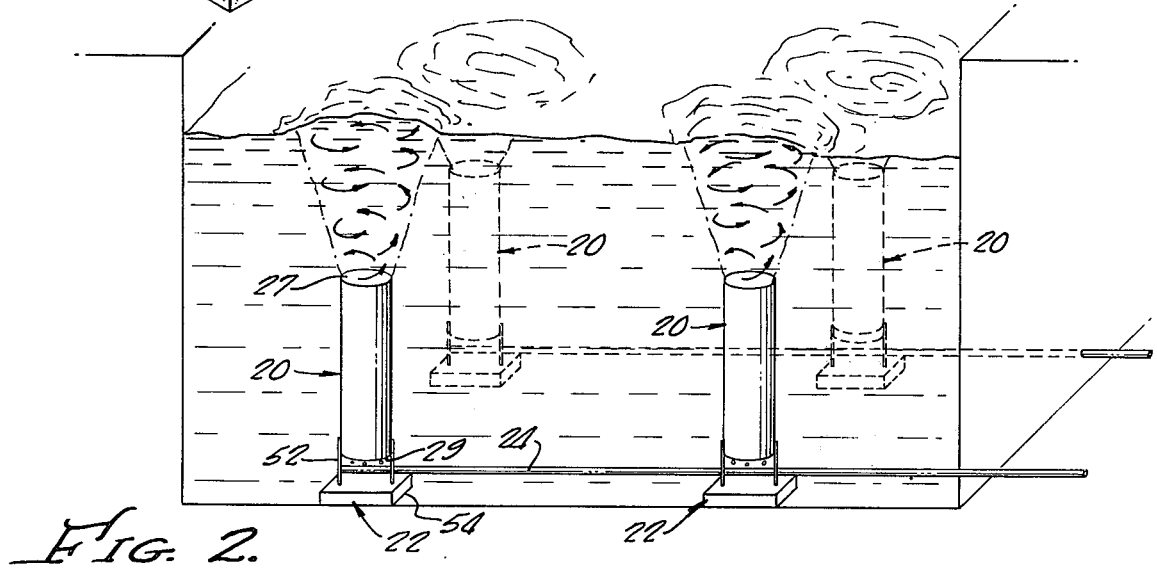
FIG. 2 is a view showing several pneumatic lifts as typically installed in a water aeration facility.

As shown in FIG. 2, the aerator is preferably entirely submerged in the liquid to be aerated. For best efficiency, an open upper end 27 of the tube 20 should be at, or below, mid-depth of the liquid in which the aerator is immersed. In any event, for good efficiency the upper end 27 of tube 20 should be at least a tube diameter below the surface of the liquid, although some aeration is possible even with the upper end of the tube above the surface of the liquid, providing that the upper end is not so far above the surface that pumping of the liquid through the tube does not occur.

An air or pneumatic lift pump principle is utilized by the aerator. Air (or any other type gas) is supplied through the line 24 from a suitable source, such as an air blower or compressor, not shown. The line 24 (FIG. 1) has openings or orifices 28 (which may include back flow preventers to keep the liquid out of the line 24 when air pressure is shut off) positioned below an open lower end 29 of tube 20 such that air bubbles leaving the opening 28 rise into and through the tube. The mixture of air bubbles and liquid within causes the column of air and liquid in the tube to be less dense (lighter) than the surrounding liquid and therefore causes a lifting or pumping of the liquid through the tube. Liquid is continually drawn into the bottom of the tube and discharged from the top, causing an uninterrupted liquid circulation and mixing in the reservoir.

Even without the mixing assembly 26, some of the air from the openings 28 would be absorbed by the liquid as the bubbles rise through the tube 20 and after the intermixed air and liquid is discharged from the upper end thereof. However, the mixing assembly 26 performs the extremely important function of breaking up the air bubbles discharged from openings 28. Such breaking up is very important because the sizes of the bubbles would otherwise tend to increase as they rise, not only because of the reduced liquid pressure as the bubbles approach the surface but also because of the tendency of the rising bubbles to accumulate or aggregate into increasingly larger bubbles. Liquid-air interfaces are continually disrupted and reformed in the present mixing process, a requisite for good air absorption efficiency.

The mixer assembly 26 comprises, in the preferred embodiment, a first or lower turbine 30, a second or intermediate turbine 32 and a third or upper turbine 34. Although three turbines are shown, more turbines may be used, or as few as one turbine may be used, the latter being much less desirable. The turbines 30, 32 and 34, having diameters somewhat less than the inner diameter of tube 20, are rotatably mounted in axial spaced relationship on an axially centered turbine shaft 36. They are preferably spaced about one tube diameter apart and a similar distance from each end of the tube and are maintained in spaced relationship by suitable means, such as by collars 38. The turbines are preferably rotatably mounted on shaft 36 being thereby free to rotate independently.

So as to have substantially identical rotational speeds, the turbines 30 and 34 are substantially identical in the preferred embodiment. Both comprise a number of radial turbine blades 40 emanating from a central hub 42 having a streamlined downstream flow diverger 43. The turbine blades, of turbine or propeller blade design, are such that the upward flow of liquid and air through the tube 20 causes the turbines 30 and 34 to rotate at relatively high rates of speed.

Fewer turbine blades 44 (on a hub 45) are used on the intermediate turbine 32. Thus, the turbine 32 is caused to rotate at a considerably slower rate than are turbines 30 and 34. The different rotational speeds of adjacent turbines optimizes the breaking up of the air bubbles from the tube 24 into very small gas bubbles, optimizes the destruction and creation of liquid-air interfaces, and optimizes the dispersion of the very small air bubbles into the liquid.

Upwardly flowing air and liquid in the tube 20, acting on the turbine blades, provides the sole motive power for causing the turbines to rotate, and thereby break up the air bubbles and disperse the very small air bubbles formed therefrom. No external driving force, such as a motor, is needed or used to turn the turbine elements. Therefore, the aerator is very simple and reliable, requires a negligible amount of maintenance, and is economical to produce and operate.

Figure 3:
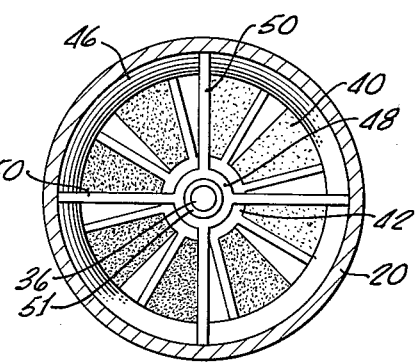
FIG. 3 is a horizontal sectional view along line 3—3 of FIG. 1, showing the annular rings.

The turbine shaft 36, upon which turbines 30, 32, and 34 are mounted, is maintained in position along the longitudinal axis of the tube 20 by a pair of annular rings 46, one being below and closely adjacent to turbine 30 and the other being below and closely adjacent to turbine 34. However, if more than three turbines are used it may be desirable to use more than the two rings shown. A central hub 48 (FIG. 3) at the intersection of cross members 50 having outer ends attached to rings 46 (as by being inset therein when the rings are molded or otherwise formed) supports the shaft 36 which may be either press fit therewithin and thus be nonrotatable, or which may be loosely fit therewithin and be rotatable. Longitudinal movement of the shaft is prevented by nuts 51 threaded on end portions thereof above the turbine 34 and below the hub 48 of the lower ring 46.

Figure 4:
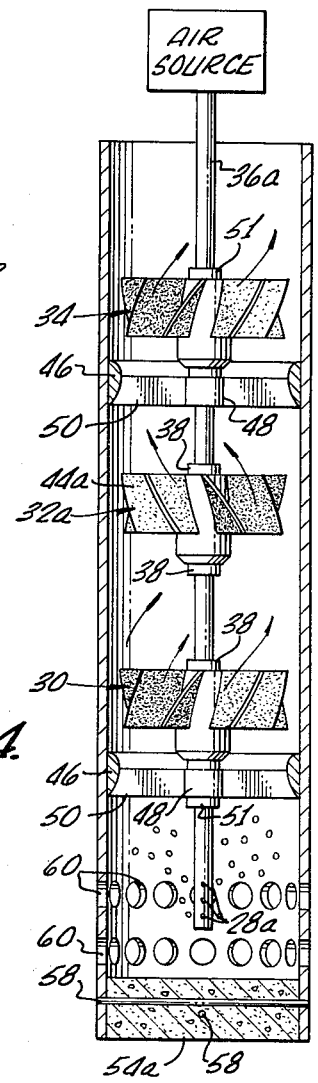
FIG. 4 is a vertical sectional view of a variation of the preferred embodiment showing contrarotating turbine elements.

The length of the shaft 36 is substantially that of the mixer assembly 26. It may, alternatively, be made longer and also made hollow with radial openings 28a below the turbine 30 so that air may be supplied to the tube 20 through a shaft 36a, either from above (as illustrated in FIG. 4) or from below, rather than through the tube 24. If air is supplied through the shaft 36a, the tube 20 may be supported directly by the shaft, thus eliminating the need for the support 22.

The annular rings 46, preferably having a semicircular or arcuate cross section with the curved portion directed inwardly toward the shaft 36, create a venturi effect to increase the upward flow velocity of the air and liquid before they impinge upon the turbines 30 and 34. This increased flow velocity into the turbines results in increased aerator efficiency by increasing the rotational speed of the turbines.

The support 22 comprises a pair of spaced vertical straps 52 set into a weight 54 (for example, a concrete block). A horizontal reinforcing strip 56 is connected between lower exposed regions of straps 50. The tube 20 is attached to the straps 52 as by riveting.

Alternatively, as shown in FIG. 4, the support may comprise a weight 54a, such as concrete, at the lower end of the tube 20 and connected thereto by rods 58 which extend through the weight and the walls of the tube. Multiple holes 60 are provided in the lower end of the tube 20 for the inward flow of liquid, inasmuch as the lower, normally open end of the tube is blocked by the weight 54a. The lower end of the shaft 36a may be anchored in the weight 54a (in a manner not shown) thereby eliminating the need for a lower annular ring 46. Use of the weight 54a in the lower end of the tube 20 is particularly advantageous when air is supplied through the shaft 36a, and the aerator is suspended from the upper end thereof. The aerator is thus made easily removable from an aeration tank, the weight 54a assuring vertical positioning of the tube. As used herein and in the appended claims, the term "opening" as applied to the air lift tube (or chamber defining means) is to be understood to include both a single large opening (such as the open lower end 29) or multiple smaller openings (such as the holes 60).

A mixer assembly variation of the invention is shown in FIG. 4. This variation also employs within a tube 20 three mutually spaced turbines, a first or lower turbine 30, a second or intermediate turbine 32a and a third or upper turbine 34. The mounting angle of the turbine blades 44a on turbine 32a is such that the intermediate turbine is caused to rotate in the opposite direction to that of turbines 30 and 34. That is, rather than the intermediate turbine rotating slower (or faster) than the upper and lower turbines, it rotates counter to them. Contrarotation of the intermediate turbine enhances the breaking up of the air bubbles into very small bubbles, the destruction and creation of liquid-air interfaces and the dispersion of the very small air bubbles into the liquid in substantially the same manner as does the different rotational speeds of adjacent turbines, as described above. The contrarotational speed of the intermediate turbine element 32a is preferably, but not necessarily, substantially equal to the rotational speed of the adjacent turbine elements 30 and 34.

METHOD OF THE INVENTION

Stated generally, the method comprises rotatably mounting a turbine wheel or propeller below the surface of a body of liquid, and releasing a gas adjacent the wheel, the relationships being caused to be such that the gas causes the wheel to rotate at a sufficiently high rate of speed to break up the gas into small bubbles. The method is preferably performed in a pneumatic lift tube. Preferably, the gas is released well below the wheel, and passes upwardly thereto in the form of bubbles.

For the presently-described apparatus, air (or other gas) bubbles exiting tube 24 (FIG. 1) through openings 28 rise, thereby causing an upward flow of liquid through the tube. This upward flow of air bubbles and liquid causes the turbines 30, 32 and 34 to rotate rapidly on the shaft 36. The air bubbles are therefore broken up into vast numbers of very much smaller air bubbles, and these very small air bubbles are homogeneously dispersed in the liquid rising through the tube. The action of the turbines thus creates conditions essential for highly efficient absorption of the air by the liquid. Because of the very highly efficient absorption rate obtained by the use of the turbines, the ratio of tube length to tube diameter of tube 20 is small in comparison to that of prior art aerator tubes. Inasmuch as absorption of the air continues in the turbulent region above the upper end 27 of the tube (the turbulence being caused by the discharge of air and liquid from the top of the tube), it is generally desirable that the depth of liquid above the top of the tube be equal to the height of the tube itself.

When the method is performed in shallow ponds or holding tanks, such as are commonly used in the treatment of sewage or the purification of water, there results a considerable cost savings. This is because a comparatively few large diameter aerators may be used, rather than a large number of smaller diameter aerator tubes of the prior art. Also, because of the greater absorption rate provided by the breaking up of the air bubbles into a vast number of very small air bubbles and the efficient disruption and creation of liquid-air interfaces, there is minimum loss of unabsorbed air from the surface of the liquid. Consequently, the amount of air which must be pumped through these aerators is minimized, thereby minimizing compressor power requirements.

Although, as shown in FIG. 2, aerators of the type described are particularly adaptable for use in shallow pools or holding tanks, because of the relatively small tube length to diameter ratios, the aerators are equally adaptable to aeration of deep bodies of water. It is possible, if desired, in deep tanks to employ more than three turbines per tube and consequently to employ longer aerators such that an even smaller number of aerators may be used.

ILLUSTRATIVE EXAMPLE

The following is presented by way of example only, and no limitation is intended. It is to be understood that all values given are approximate.

For a typical, shallow tank (about 8 feet deep) used in sewage treatment, the length of tube 20 may be 4 feet and its inner diameter may be 1 foot. The flow of air through the line 24 may be 17 standard cubic feet per minute with the air pressure at openings 28 being 2 psi greater than the surrounding water pressure. This upward flow of air through the tube 20 causes an upward flow of 210 cubic feet per minute of water therethrough. The inner diameter of each ring 46 is ten inches. The pitch of the eight turbine blades 40 of turbines 30 and 34, (which are eight inches in diameter) are such as to cause, with the above flow of air and water, a speed of 200 rpm. The pitch of the three blades 44 of turbine 32 (which is 10 inches in diameter) is such as to cause the turbine 32 to turn at 75 rpm. A cone of intermixed air and water, having sides 17° from the vertical, is formed above the upper ends of the tubes 20.

The materials used in the construction of the aerator may be any noncorroding material (depending upon the liquid in which the aerator is to be used). The tube 20 may be stainless steel, polyvinyl chloride plastic or fiberglass. The turbines may be stainless steel or urethane plastic. The shaft 36 may be stainless steel. In embodiments this far tested, the tube is formed of polyvinyl chloride plastic, each turbine and annular ring of urethane plastic and the shaft and shaft-supports of stainless steel.

The foregoing description has been by way of illustration and example only, and no limitation is thereby intended, the scope of the invention being limited solely by the claims.

I claim:

1. An aerator for dispersing a gas into a liquid, comprising:
   a. a tube having upper and lower openings,
      said tube being adapted for substantially vertical immersion in a body of liquid and for a flow of liquid therethrough,
   b. one or more turbines having diameters smaller than the inside diameter of said tube,
      said turbines being rotatably mounted on a common shaft and being adapted for rotating in response only to a flow of gas bubbles and liquid therethrough,
   c. means for mounting said turbines in said tube and for causing a venturi effect in regions of said tube,
      said means including one or more annular rings positioned below and adjacent to one or more of said turbines, and
   d. gas supply means for delivering a gas to a lower region of said tube below said turbines whereby gas bubbles rising through said tube cause a flow of gas and liquid upwardly through said tube when said tube is immersed in a body of liquid,
      said liquid being drawn in at said lower opening of said tube and being discharged from said upper opening thereof,
      the flow of said liquid causing said turbines to rotate to break up said gas bubbles into very much smaller gas bubbles and to disperse said very much smaller gas bubbles into the liquid flow,
      said liquid flow increasing in velocity as it passes through said annular rings thereby causing adjacent turbines to rotate at faster rates than they would otherwise rotate.

2. The aerator of claim 1 wherein three turbines are employed and wherein one of said annular rings is positioned below and adjacent to the uppermost of said three turbines and another of said annular rings is positioned below and adjacent to the lowermost of said three turbines.

3. The aerator of claim 1 wherein said plural turbines have a common axis of rotation, said common axis being substantially coincident with the longitudinal axis of said tube.

4. The aerator of claim 1 wherein said rotatable mixer means includes an axial mounting shaft substantially along the longitudinal axis of said tube,
   said shaft being hollow so as to form a portion of said gas supply means, gas being supplied to said lower region of said tube through openings in said shaft.

5. The aerator of claim 4 wherein said shaft is also used to support said tube in said body of liquid, said tube being suspended by said shaft.

6. The aerator of claim 5 wherein a weight is attached to the lower end of said tube whereby vertical suspension of said tube is assured.

7. The aerator of claim 1 wherein the length of said tube is approximately four times its diameter.

8. The aerator of claim 1 wherein said turbines are axially spaced apart a distance equal to approximately the inner diameter of said tube.

9. The aerator of claim 8 wherein the upper and the lower of said turbines are spaced inwardly from their respective ends of said tube a distance approximately equal to the inner diameter of said tube.

10. The aerator of claim 1 wherein at least two of said turbines are so constructed as to rotate at different speeds in response to said upward flow of gas bubbles and liquid through said tube.

11. An aerator for dispersing a gas in a liquid, comprising:
 a. a tube having open upper and lower openings, said tube being adapted for a flow of gas and liquid therethrough,
 b. means for supporting said tube in a body of liquid with the longitudinal axis of said tube substantially vertical, said tube being submerged in said liquid,
 c. a gas supply means connected for delivering a supply of gas bubbles to a lower region of said tube so as to cause an upward flow of gas bubbles and liquid through said tube,
 d. rotatable mixing means for breaking said gas bubbles in said tube into a vast number of very small bubbles and for dispersing said very small bubbles in said liquid,
  said mixing means comprising plural turbines maintained in mutual spaced relationship within said tube, each of said turbines having an axis of rotation substantially parallel with said longitudinal axis of said tube, at least two of said turbines being constructed to rotate in opposite directions in response to said upward flow of gas and liquid through said tube, said means being mounted internally to said tube, said means being rotated solely by said upward flow of gas bubbles and liquid through said tube, and
 e. venturi means comprising an annular ring mounted internally to said tube adjacent one of said turbines for increasing flow velocity of said gas bubbles and liquid.

12. An aerator for dispersing a gas in a liquid, comprising:
 a. a tube having upper and lower openings,
 b. means for supporting said tube within a body of liquid with said tube submerged below the surface of said liquid and with said tube substantially perpendicular to said surface of said liquid,
 c. gas supply means for supplying gas bubbles to a lower region of said tube thereby causing an upward flow of gas bubbles and liquid therethrough from said lower opening to said upper opening,
 d. mixer means for breaking up said gas bubbles into a vast number of very much smaller gas bubbles and for dispersing said very small gas bubbles throughout said upward flow of liquid,
  said means including plural three axially spaced rotatable mixing elements disposed within said tube, each said mixing element being in the form of a turbine having an axis of rotation parallel to the longitudinal axis of said tube, the upper and lower of said mixing elements being constructed to rotate in one direction and the middle mixing element being constructed to rotate in an opposite direction,
  said elements being rotated solely by said upward flow of gas bubbles and liquid, and
 e. venturi means adjacent one of said turbines for increasing flow velocity of said gas bubbles and liquid.

* * * * *